Feb. 4, 1941. A. B. STANDLEE 2,230,391
POTATO HARVESTER
Original Filed May 21, 1938 3 Sheets-Sheet 3
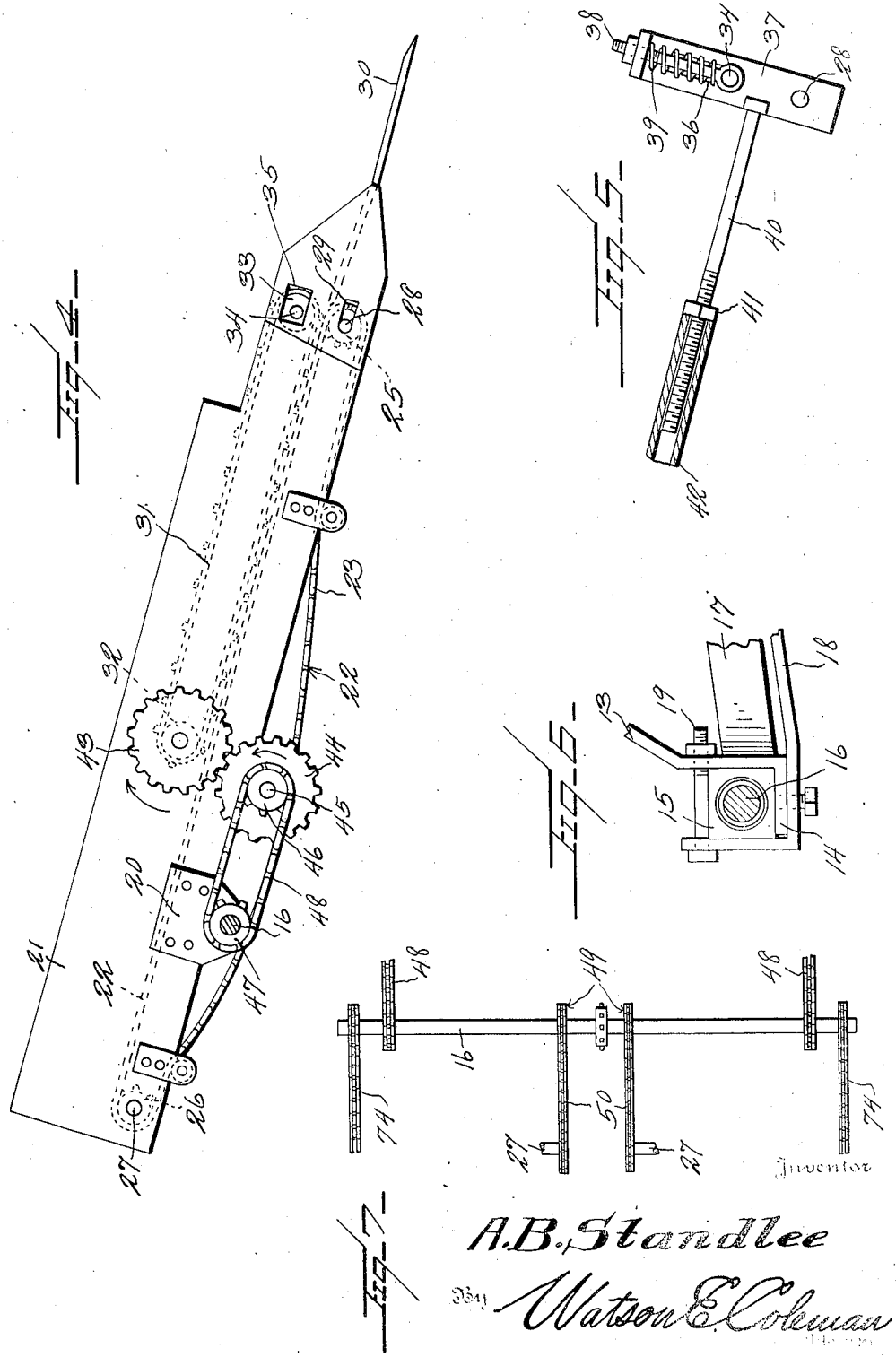

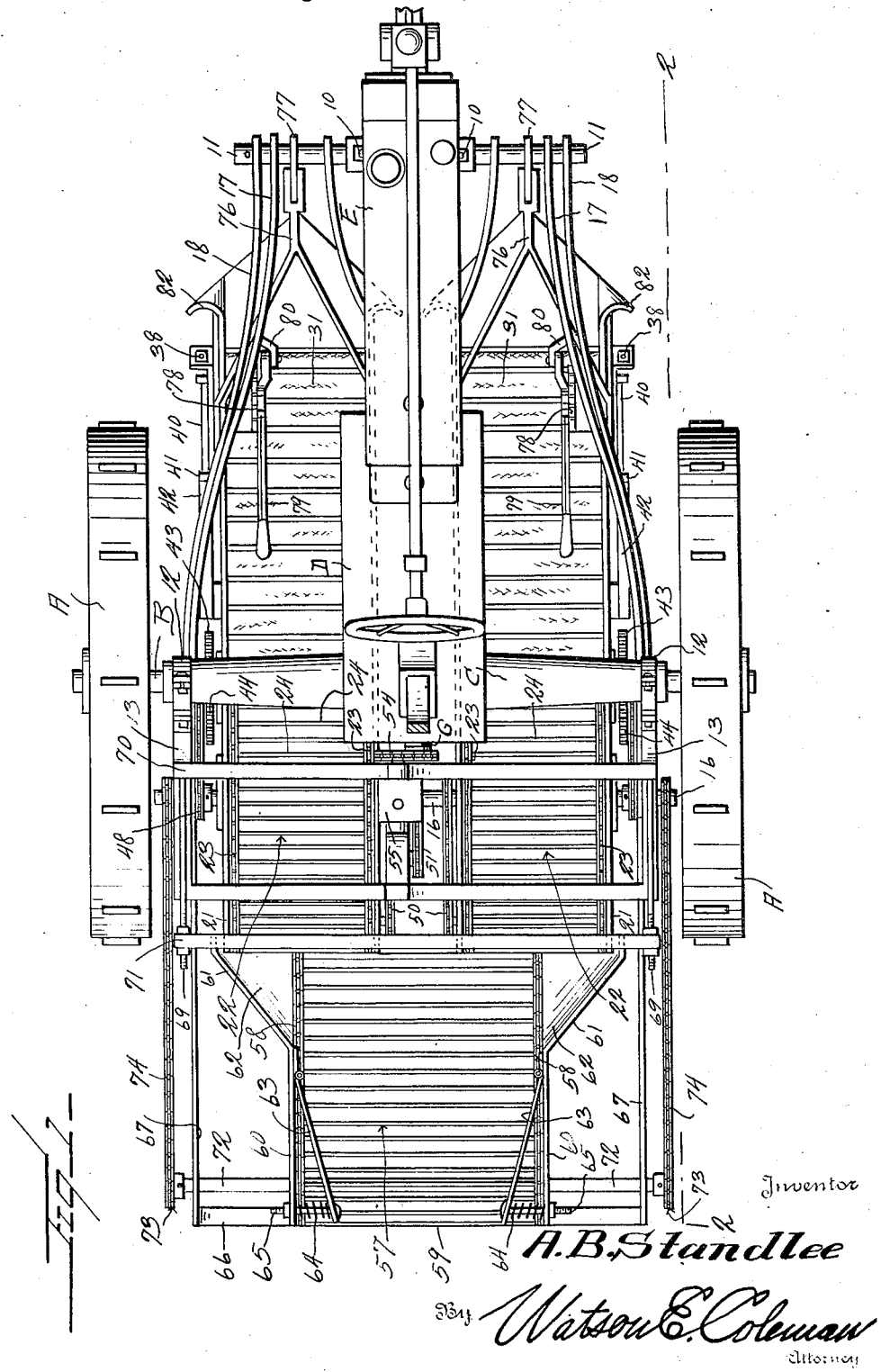

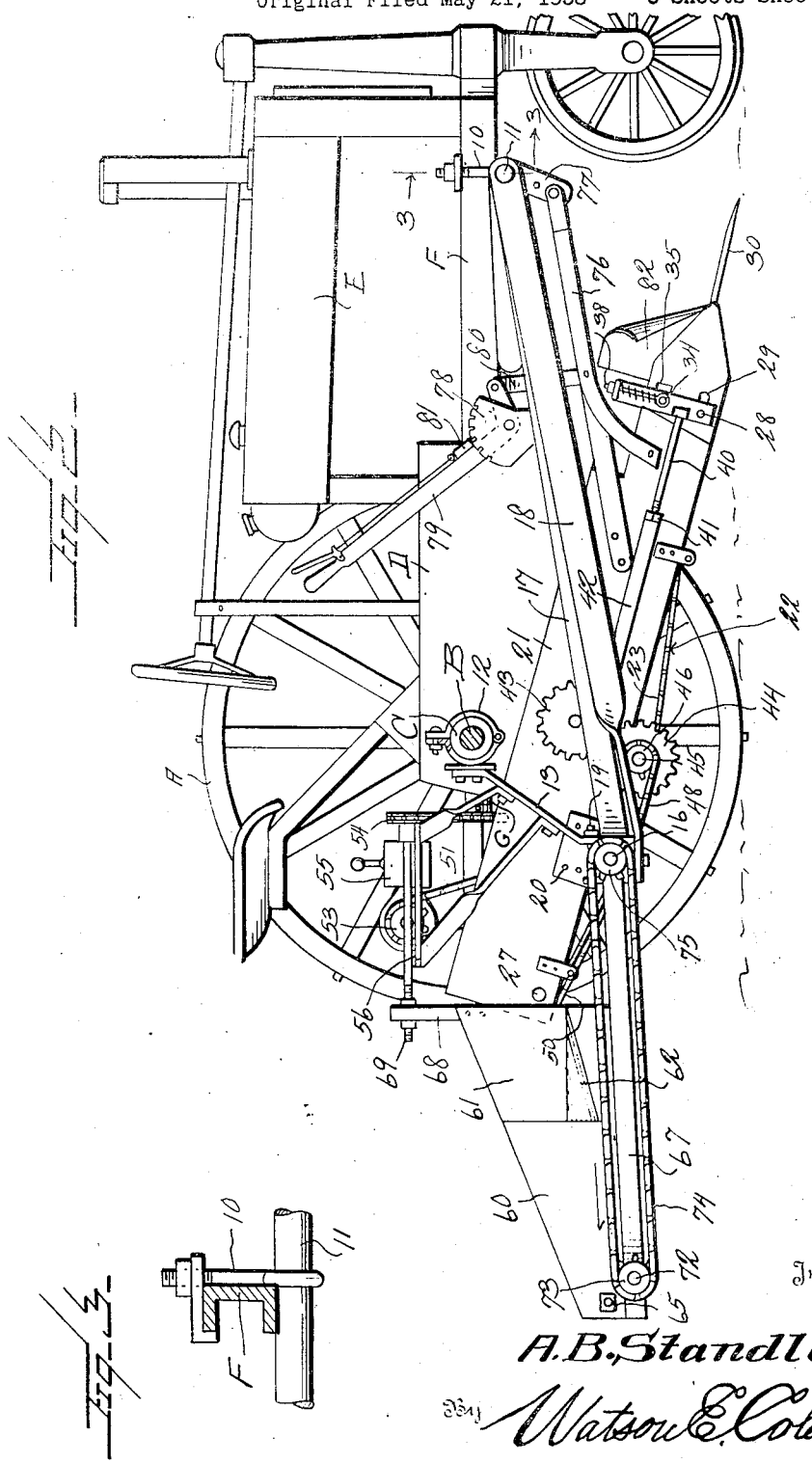

Patented Feb. 4, 1941

2,230,391

UNITED STATES PATENT OFFICE 2,230,391

POTATO HARVESTER

Arley B. Standlee, Kimberly, Idaho

Application May 21, 1938, Serial No. 209,329
Renewed June 29, 1940

11 Claims. (Cl. 55—51)

This invention relates to potato harvesters and particularly to harvesters of that type having rearwardly extending discharge conveyors extending from digging blades or shovels, which convey the potatoes rearward while permitting dirt to be discharged therefrom, the potatoes being eventually discharged upon the ground rearward of the machine.

One object of the present invention is to provide a supporting frame for the conveyors, digging shovels, etc., which is so constructed as to be underslung beneath a tractor and which is, therefore, pushed forward by the tractor in advance of but between the tractor wheels and to provide means whereby this frame may be readily connected to or disconnected from the frame of the tractor.

A further object is to provide a pair of shovels and a corresponding pair of main conveyors whereby two rows of potatoes may be dug at the same time and to provide an auxiliary conveyor at the rear ends of the main conveyors and upon which the main conveyors discharge, which will receive the potatoes from the main conveyors and discharge them in a single row between the hills previously containing potatoes.

A still further object is to provide endless aprons, the lower flights of which operate over the main elevating conveyors and which act to grab and carry up the potato vines or plants and assist in disengaging the potatoes from the vines.

Other objects have to do with the details of construction and arrangement of parts as will appear more fully hereinafter.

My improved potato harvester is illustrated in the accompanying drawings wherein:

Fig. 1 is a top plan view thereof.

Fig. 2 is a section on the line 2—2 of Fig. 1.

Fig. 3 is a detailed section on the line 3—3 of Fig. 2.

Fig. 4 is a side elevation of the frame of one of the main conveyors, the conveyors themselves being shown in dotted lines and the driving shaft being shown in section.

Fig. 5 is a detailed elevation of the means whereby the main conveyor and the apron coacting therewith may be tightened.

Fig. 6 is a fragmentary elevation of the means for supporting the frame of the conveyors upon the main shaft, the main shaft being shown in section.

Fig. 7 is a top plan diagrammatic view of the main shaft of the sprocket chains and the driving and sprocket chains leading therefrom.

In the drawings I have shown a tractor of standard form having the traction wheels A, a transverse shaft B, and the usual differential housing C. The hood enclosing the motor is designated D and the gas tank E. The chassis includes two channel irons F extending forward from the engine and supporting the usual radiator and the front steering wheel. The power take-off from the motor is designated G. All of these parts may be of any suitable or usual construction and form in themselves no part of my invention.

Clamped to the chassis channel irons F by the clamp bolts 10 (see Fig. 3) is the transverse bar 11 from which draft bars extend to the frame of the potato digger as will more fully hereinafter appear. On the axle housing C at the ends thereof, are the split clamp rings 12 from which depend the supporting braces 13, each of which is angularly bent at 14 (Fig. 6) to support a bearing box 15. A main driving shaft 16 is supported in the boxing 15 and extends entirely across the machine. The lower end of each brace 13 is connected either integrally or otherwise to a forwardly extending draw bar 17 through the forward end of which the crossbar 11 is disposed. Disposed adjacent to the draw bar 17 is a second draw bar 18 which at its rear end extends beneath the flange 14 and up against the rear side of the corresponding box 15. The bolt 19, as shown in Fig. 6, extends above the box 15 and connects the extremity of the draw bar 18 with the brace 13. The shaft 16 passes through and has bearing in plates 20 attached to the side boards 21 of the two conveyors 22.

Each conveyor 22 is endless and comprises lateral chains 23 and supporting transverse rods 24. These conveyor chains are trained over forward and rear sprocket wheels 25 and 26, the rear sprocket wheels having shafts 27 engaging in the side boards 21 while the front sprocket wheels are mounted on shafts 28 extending through the slots 29 in the side boards. The forward end of each pair of side boards carries a shovel 30 discharging onto the corresponding conveyors 22.

Disposed between each pair of side boards is an endless conveyor 31 in the form of a canvas belt having transverse cleats attached thereto. This belt may be reinforced by leather straps at the sides and may be of any suitable material. Each conveyor 31 passes over a rear roller 32 and over a front roller 33. Each end of the shaft 34 of the front roller 33 extends through an enlarged opening 35 in the corresponding side board and through a vertical slot 36 formed in a supporting element 37 (see Fig. 5). Each shaft 28 is supported in the lower ends of these elements 37 and each shaft 34 is supported at its ends by eye-bolts 38 urged downward by a spring 39. These eye-bolts may move upward freely through the flanged upper end of the corresponding element 37 against the force of a spring 39. The element 37 may be shifted forward or rearward to take up undue slack in the conveyor 22 and tighten the conveyor 31 by the threaded rod 40 having a nut 41 engaging against a tubular member 42 which is mounted on the corresponding side board 21.

The shaft of the rear roller 32 carries on it a gear wheel 43 which meshes with the gear wheel 44 carried on a shaft 45 in turn carrying a pinion 46.

The main driving shaft 16, which is driven from the take-off of the motor, as will be later stated, carries pinions 47 over which sprocket chains 48 from the pinions 46 pass. As shown in Fig. 7, the shaft 16 carries pinions 49 over which sprocket chains 50 are trained, these chains being also trained over the pinions 26.

The shaft 16 is driven by a sprocket chain 51, see Fig. 2, driven from a pinion 53. From the take-off shaft G, a sprocket chain 54 drives the pinion 53 in an obvious manner through a change speed transmission of ordinary type, the casing of which is designated 55. Any suitable means may be used for driving the pinion 53 from the take-off shaft G. This change speed transmission and allied parts are shown on a frame 56 supported by braces from the braces 13.

Disposed rearward of the conveyors 22 and receiving potatoes therefrom is a single conveyor 57 composed of lateral chains 58 and transverse rods 59. This conveyor 57 is disposed between the side boards 60 which at their forward portions are laterally inclined, as at 61, so that their forward ends are disposed outward of the conveyors 22. Disposed between the lateral chains of the conveyor 57 and the outwardly inclined portion 61 of the side boards are the small triangular decks 62 which receive the potatoes from the lateral portions of the conveyors 22 and guide these potatoes onto the conveyor 57. Hingedly attached to the inner faces of the side boards are the deflecting plates 63 which extend rearward and at their free rear ends are urged outward by springs 64 surrounding the limiting bolts 65, thus these deflecting plates 63 tend to force the potatoes toward the middle of the discharge end of the conveyor 51 but will yield if potatoes should tend to become jammed.

The conveyor 57 is supported at its rear end by a transverse bar 66 in turn supported by longitudinal bars 67 extending to the shaft 16 and through which the shaft 16 passes. Attached to the side boards 60 at their forward ends are the upwardly extending braces 68 which are connected by bolts 69 to a cross bar 70 which constitutes a support for the transmission shaft which passes through the change speed gear casing 55. The uprights 68 are also connected by a transverse cross bar 71. For the purpose of driving the shaft 72 which drives the chains 58 of the conveyor 57, I mount sprocket wheels 73 on the ends of this shaft and train sprocket chains 74 over these sprocket wheels 73 and over sprocket wheels 75 mounted on the shaft 16.

It will be noted that the side boards 21 which constitute the supporting frame for the conveyor 22 and the apron 31 are rockingly mounted upon the shaft 16 by means of the plates 20 and thus the conveyor frames formed by the side boards 21 may be raised or lowered at their forward ends together with the shovels 30. For the purpose of raising and lowering the forward ends of these conveyor frames, I provide the bifurcated draw bars 76 (see Figs. 1 and 2) which are pivoted by bolt holed links 77 to the cross bar 11, the ends of these bifurcated draw bars being attached to the side boards 21 of the corresponding conveyor 22. Mounted upon each of the draw bars 17 is a sector plate 78 carrying a bell crank lever 79 which is connected to the draw bars 76 by the link 80. The bell crank lever 79 is, of course, provided with a locking bolt 81 engaging the sector plate 78 and the handle of the bell crank lever is provided with the usual hand grip whereby the locking bolt may be retracted. By this means either of the frames for the conveyors 22 and the corresponding shovels may be raised or lowered so as to control the amount that the shovels dig into the ground.

It will be noted from Figs. 1 and 2 that the forward ends of the side boards 21 are provided with laterally curved deflecting plates 82 which tend to guide material lifted by the shovel into the upper portion of the shovel between the walls or side boards of the conveyor.

It will be seen that with this construction two rows of potatoes may be dug at one time, both of these rows being carried upward and discharged into the space between the two rows by means of the rear conveyor 57. This makes it much more convenient for the gathering of the potatoes than if the potatoes were discharged in two piles or rows over the top of the already dug ground and aids very materially in gathering the potatoes into wagons or sacking the potatoes. It will likewise be seen that with this construction the vines or potato plants will be grabbed by the apron 31 and drawn upward along with the potatoes themselves and thus will prevent any jamming. This apron tends to flatten the vines so that they will not become entangled with any moving parts and tends to disengage the potatoes from the vines. Of course, the vines are discharged upon the apron 22 and carried rearward and discharged at the rear of the machine. By reason of the fact that the shaft 34 may move upward against the action of the spring 39 as shown in Fig. 5, the apron 31 will lift or rise to permit the entrance of the potatoes and of the vines. Inasmuch as the apron 31 is of canvas, it will not act to bruise the potatoes but will simply hold the potatoes and the vines firmly in place and by engaging the vines will draw the potatoes upward over the shovel 30 and onto the belt 22. The depth to which the shovels may dig is controlled by the bell crank lever 79. The whole structure is underslung beneath the tractor and is supported thereby so that the potato harvester is not drawn behind the tractor as is usually the case but is pushed by the tractor, and the wheels of the tractor, running between the rows, will not, of course, injure the potatoes. The attachment may be very readily applied to or disconnected from the tractor by releasing the clamp bolts 10, thus disconnecting the transverse shaft 11 from the channel iron frames. The split rings 12 may be disconnected from the differential housing C and this entirely disconnects the supporting frame from the tractor, it, of course, being necessary to disconnect the take-off shaft G from the sprocket chain 54.

While I have illustrated certain details of construction and certain arrangement of parts, I do not wish to be limited to these details except as defined in the appended claims.

It will be understood that in the operation of this potato digger, the upper part of conveyor 22 pulls the dirt and potatoes out from under the vines leaving the vines hooked over the side boards 21. As soon as they are started, they travel on through the main conveyor and drop off on top of the ground with the potatoes. The apron 31 acts to start the vines through the machine, pressing the vines against the dirt and the potatoes on top of the conveyor 22. The apron 31 does not detach the potatoes from the vines but acts to press the vines against the dirt until the vines are pulled up onto the conveyor 22.

It will be seen that this digger takes two rows at a time, delivering the potatoes at the rear end of the digger in one row. Throwing two rows into one as the potatoes leave the digger prevents the tractor wheels from running over potatoes that have already been dug when the tractor is moving through an adjacent row. The potato digger which I have illustrated digs to the ends of the rows so that no hand-digging or shovel digging is necessary to dig out all the potatoes in the row. With this construction, by lifting the diggers through the aid of levers 79, a sharp turn can be made so as to get the next two rows after the two rows that have just been finished without having to go in a long circle. This saves a great amount of time by eliminating such long turns at the ends of the rows. As the digger is swung beneath the tractor, sufficient traction is given to the digger without adding weights thereto as is necessary with the ordinary digger which is pulled behind the tractor. The digger can be attached or detached in a few minutes by loosening the two nuts on the front clamps 10, dropping the front end of the digger and then loosening the four nuts on the hinge clamps 12, thus allowing the digger to swing clear when the tractor may be driven away. It may be remarked in this connection, that when it is desired to remove the digger, the sprocket wheel from the driving take-off is removed from this take-off shaft. The vine clawing apron 31 does away with an extra man. In other diggers known to me, an extra man is required besides the tractor driver to start the vines through and also to lift or lower the lever which raises the digger shovels out of the ground. With my construction the driver or operator besides driving the tractor, can raise the shovels by means of the levers without leaving the driver's seat, thereby requiring but one man to operate the tractor and digger, the apron 31 starting the vines up the conveyor 22 without the necessity of a helper. With my construction if only one row of potatoes is to be taken at a time, then only one digger may be used, the other digger being raised.

What is claimed is:

1. A potato harvester adapted to be supported beneath a tractor, including two shovels spaced to operate on two adjacent rows, two main conveyors one associated with each shovel and upon which the shovels discharge, a shaft suspended transversely beneath the tractor and supporting and operatively coupled with the said conveyors, drive means connecting said shaft with the power mechanism of the tractor and a single rear medially disposed conveyor upon which both of the main conveyors discharge, driving means coupling said shaft with the rear conveyor the rear conveyor being of an overall width less than the combined overall widths of the main conveyors discharging at its rear end, and means for guiding material from the main conveyors onto the rear conveyor.

2. A potato digger, including a supporting frame, a conveyor frame carried thereby and including side boards, a shovel, a main conveyor upon which the shovel discharges, and an endless apron disposed above and having its lower run contacting the upper run of the main conveyor and coacting therewith to grasp the potato plants and potatoes between it and the main conveyor to draw the plants onto the latter conveyor.

3. A potato digger, including a supporting frame, a conveyor frame carried thereby and including side boards, a shovel at the lower end of the main conveyor frame, a main conveyor operating on the conveyor frame and upon which the shovel discharges, the main conveyor comprising side chains and transverse spaced rods, and an endless apron of flexible material having transverse cleats, the apron being disposed above the main conveyor and having its lower flight extending approximately parallel to the upper flight of the main conveyor through a portion of the length thereof from the shovel end and engaging said upper flight and to grasp the potatoes between it and the main conveyor.

4. A potato harvester adapted to be mounted beneath a tractor, including two shovels spaced to operate on two adjacent rows of potato hills, two main conveyors each associated with one of said shovels and upon which the shovels discharge and composed of side chains and transverse spaced rods, a single rear medially disposed conveyor having an overall width less than the combined overall widths of the main conveyors upon which both of the main conveyors discharge and composed of side chains and transverse spaced rods, means rearwardly of each main conveyor adjacent the outer side thereof for guiding potatoes inwardly toward and onto the rear conveyor and endless aprons one for each of the main conveyors and having their lower flights extending parallel with and in close proximity to the main conveyors and composed of flexible material having transverse cleats, and means resiliently urging the endless aprons toward the main conveyors.

5. A potato digger, including two conveyor supporting frames disposed in parallel relation, means for supporting said frames in underslung relation to a tractor, each frame including two side boards and a shovel at the forward end of the frame, main conveyors mounted upon said frames and upon which the shovels discharge, endless aprons mounted between said side boards and above the main conveyors each having its lower flight disposed approximately parallel with and in close proximity to the upper flight of the corresponding main conveyor, a rear medially disposed conveyor frame having side boards, an endless conveyor mounted on the rear frame and upon which the main conveyors discharge, said rear conveyor being of less width than the combined widths of the main conveyors, means at the rear of each main conveyor and at the side of the rear conveyor for guiding potatoes from the main conveyors on the rear conveyor, means for driving the several conveyors and the aprons from the tractor, and means for vertically adjusting the forward ends of the main conveyors independently of each other.

6. A potato digger, including two main conveyor supporting frames having side boards and each having a shovel at its forward end, two main endless conveyors mounted between said side boards, an endless apron mounted between the side boards of each conveyor frame and having its lower flight extending parallel and adjacent to the upper flight of the corresponding main conveyor, a transverse shaft extending beneath both main conveyor frames and operatively connected to the main conveyors to drive them and the endless aprons, draw bars operatively connected to said shaft and extending forwardly therefrom, a transverse bar to which all of said draw bars are pivotally connected, means for detachably engaging said transverse bar with the forward end of a tractor frame, means connected to the rear ends of said draw bars and operatively engaged with said transverse shaft and including supporting braces extending upward and having split clamping rings at their upper ends for engagement with the differential housing of the tractor, a rear medially disposed conveyor frame having side boards, a conveyor disposed between said side boards, means at the rear of each main conveyor for receiving potatoes from the outer sides thereof and discharging them toward the center of and onto the rear conveyor, means affording a driving connection between said shaft and the last-named conveyor, manually operable means for adjusting the forward ends of the main conveyor vertically, and means affording driving connection between said shaft and the motor of the tractor.

7. A potato digger, including two main conveyor supporting frames having side boards and each having a shovel at its forward end, two main endless conveyors mounted between said side boards, an endless apron mounted between the side boards of each conveyor frame and having its lower flight extending parallel and adjacent to the upper flight of the corresponding main conveyor, a transverse shaft extending beneath both main conveyor frames and operatively connected to the main conveyors to drive them and the endless aprons, draw bars operatively connected to said shaft and extending forwardly therefrom, a transverse bar to which all of said draw bars are pivotally connected, means for detachably engaging said transverse bar with the forward end of a tractor frame, means connected to the rear ends of said draw bars and operatively engaged with said transverse shaft and including supporting braces extending upward and having split clamping rings at their upper ends for engagement with the differential housing of the tractor, a rear medially disposed conveyor frame having side boards, a conveyor disposed between said side boards, means affording a driving connection between said shaft and the last-named conveyor, manually operable means for adjusting the forward ends of the main conveyor vertically, and means affording driving connection between said shaft and the motor of the tractor, the side boards of the rear conveyor being forwardly and laterally extended at their rear ends to extend laterally outward of the outer side boards of the main conveyors and there being decks disposed laterally of the rear conveyor and receiving potatoes from the main conveyors and guiding the potatoes onto the rear conveyor.

8. A potato digger, including two main conveyor supporting frames having side boards and each having a shovel at its forward end, two main endless conveyors mounted between said side boards, an endless apron mounted between the side boards of each conveyor frame and having its lower flight extending parallel and adjacent to the upper flight of the corresponding main conveyor, a transverse shaft extending beneath both main conveyor frames and operatively connected to the main conveyors to drive them and the endless aprons, draw bars operatively connected to said shaft and extending forwardly therefrom, a transverse bar to which all of said draw bars are pivotally connected, means for detachably engaging said transverse bar with the forward end of a tractor frame, means connected to the rear ends of said draw bars and operatively engaged with said transverse shaft and including supporting braces extending upward and having split clamping rings at their upper ends for engagement with the differential housing of the tractor, a rear medially disposed conveyor frame having side boards, a conveyor disposed between said side boards, means affording a driving connection between said shaft and the last-named conveyor, manually operable means for adjusting the forward ends of the main conveyor vertically, means affording driving connection between said shaft and the motor of the tractor, the side boards of the rear conveyor being forwardly and laterally extended at their rear ends to extend laterally outward of the outer side boards of the main conveyors and there being decks disposed laterally of the rear conveyor and receiving potatoes from the main conveyors and guiding the potatoes onto the rear conveyor, and guides hingedly mounted upon the inner faces of the side boards for the rear conveyor, said guides normally extending rearward and towards each other and being resiliently urged to this position.

9. A potato harvester adapted to be supported beneath a tractor, comprising two shovels spaced to operate on two adjacent rows of potatoes, two main conveyors each associated with a shovel and upon which the shovels discharge, a shaft suspended transversely beneath the tractor and supporting and operatively coupled with the said conveyors, driving connecting means between said shaft and the power mechanism of the tractor, a single rear medially disposed conveyor upon which both of said main conveyors are adapted to discharge, means at the rear ends of said main conveyors for guiding material discharged therefrom toward the center of and onto the rear conveyor, driving means coupling said shaft with the rear conveyor, and guide means at the sides of the rear conveyor directed in convergent relation toward the rear discharge end of the rear conveyor, said guide means being yieldable at their rear ends toward the adjacent sides of the rear conveyor.

10. In a potato digger, including a supporting frame, a conveyor frame carried thereby and including side boards, a shovel, a main conveyor upon which the shovel discharges, and an endless apron disposed above and having a lower run contacting with the upper run of the main conveyor and coacting therewith to grasp potato plants and potatoes between it and the main conveyor to draw the plants and potatoes onto the conveyor, the said apron having the end nearest the shovel supported for movement relatively to the main conveyor.

11. In a potato digger, including a supporting frame, a conveyor frame carried thereby and including spaced side boards, a shovel secured between said side boards at one end of the conveyor frame and extending longitudinally forwardly therefrom, a main conveyor extending longitudinally between said side boards upon which the shovel discharges, a shaft disposed transversely of and between the side boards and overlying the main conveyor, a second shaft disposed transversely between the side boards adjacent the forward end of the main conveyor and overlying the latter, said second shaft having its ends extending through openings in the side boards, a bearing supported by each side board at each end of the second-mentioned shaft and supporting the same for vertical movement, resilient means normally resisting the vertical movement of each bearing, an endless apron connected between said shafts and disposed to have its lower run contacting with the upper run of the underlying main conveyor, and means for simultaneously moving said conveyors whereby the adjacent runs thereof will move away from the shovel.

ARLEY B. STANDLEE.